(12) United States Patent
Mao (10) Patent No.: US 8,559,471 B2
(45) Date of Patent: Oct. 15, 2013

(54) HIGH-POWER DIODE END-PUMPED SOLID-STATE UV LASER

(76) Inventor: Guilin Mao, Beachwood, OH (US)

( * ) Notice: Subject to any disclaimer, the term of this patent is extended or adjusted under 35 U.S.C. 154(b) by 193 days.

(21) Appl. No.: 12/951,320

(22) Filed: Nov. 22, 2010

(65) Prior Publication Data

US 2011/0122896 A1 May 26, 2011

Related U.S. Application Data (60) Provisional application No. 61/263,521, filed on Nov. 23, 2009.

(51) Int. Cl.
*H01S 3/10* (2006.01)
(52) U.S. Cl.
USPC .................................. 372/22; 372/10; 372/21
(58) Field of Classification Search
USPC ................................................ 372/10, 21, 22
See application file for complete search history.

(56) References Cited

U.S. PATENT DOCUMENTS

| 4,656,635 A | 4/1987 | Baer et al. |
| 4,734,912 A | 3/1988 | Scerbak et al. |
| 4,794,615 A | 12/1988 | Berger et al. |
| 4,942,586 A | 7/1990 | Lai |
| 5,410,559 A | 4/1995 | Nighan, Jr. et al. |
| 6,031,854 A | 2/2000 | Ming |
| 6,246,707 B1 * | 6/2001 | Yin et al. ................ 372/25 |
| 6,287,298 B1 * | 9/2001 | Nighan et al. ........... 606/10 |
| 6,327,281 B1 * | 12/2001 | Yin ........................ 372/22 |
| 6,999,483 B1 * | 2/2006 | Yin ........................ 372/22 |
| 2002/0154672 A1 * | 10/2002 | Friesem et al. ......... 372/92 |

* cited by examiner

*Primary Examiner* — Yuanda Zhang
(74) *Attorney, Agent, or Firm* — Dominic A. Frisina; Frisina, LLC (57) ABSTRACT

A high-power diode end-pumped solid-state UV laser comprises high-power fiber-coupled end pumping laser diodes, a specially designed fundamental laser cavity and multiple high-power high-efficiency harmonic generations. Nonuniform fundamental laser cavity has to be used, i.e. the beam size of the fundamental laser cannot be uniform in the fundamental cavity. Thermal transfer inside the laser crystal and harmonic crystal has to be specially and carefully treated, and special crystal mounts were designed to optimize the thermal contact and maximize the heat transfer. In addition, harmonic crystal mounts were specially designed to minimize the loss and protect the hydroscopic crystals.

35 Claims, 6 Drawing Sheets

Table 1: Intracavity UV or Deep-UV harmonic generation

|   | Polarized laser crystal (e.g. Nd:YVO4) | Non-polarized laser crystal (e.g. Nd:YAG) |
|---|---|---|
| F | ~808/888nm → 1064nm (H) | ~808nm → 1064(H) + 1064(V) |
| SHG | o + o → e<br>1064(H)+1064(H)→532(V) | o + o → e<br>1064(H)+1064(H)→532(V)<br>1064(V)+1064(V)→532(H) |
| THG | o + e → o<br>1064(H)+532(V)→355(H) | o + e → o<br>1064(H)+532(V)→355(H) |
| FHG | o + o → e<br>1064(H)+355(H)→266(V)<br>532(V)+532(V)→266(H) | o + o → e<br>1064(H)+355(H)→266(V)<br>532(V)+532(V)→266(H) |
| 5HG | External cavity | o + o → e<br>532(H)+355(H)→213(V) |

FIG. 12

HIGH-POWER DIODE END-PUMPED SOLID-STATE UV LASER

CROSS-REFERENCE TO RELATED APPLICATIONS

This application claims the benefit of provisional patent application Ser. No. U.S. 61/263,521, filed 2009 Nov. 23 by the present inventor

FEDERALLY SPONSORED RESEARCH

Not Applicable

SEQUENCE LISTING PROGRAM

Not Applicable

BACKGROUND

1. Field

This application relates to solid-state laser, specifically high-power diode end-pumped solid-state laser and its UV and deep-UV harmonic generations.

2. Background

Diode-pumped solid-state laser has become more and more attractive due to its compactness, high-efficiency, and long lifetime (also see U.S. Pat. Nos. 4,942,586 4,656,635). End pumping has received even more attention recently due to several additional advantages (also see U.S. Pat. No. 4,794,615): (1) Easy to do the mode matching between the pump and the laser beam, resulting in good laser beam quality; (2) High optical efficiency. An end-pumped Nd-doped (such as Nd:YAG, NdWO, or NdYLF) laser can reach an optical efficiency of 20% to 60%; (3) Compact and easy to maintain.

High-power solid-state UV and deep-UV laser is greatly needed in both academic researches and industrial applications, such as particle ionization experiment, filamentation experiment, fuel spray, material processing, lithography, photo-refractive medical surgeries, and so on. However, the power level of current commercial diode-pumped solid-state UV laser is still very limited (For example, see Coherent brochure, the highest 266 nm laser can only output 3 W).

High-power diode end-pumped solid-state UV laser can be achieved only when it is optimized in every aspect. This invention comprises the following four aspects:

(1) High-power fiber-coupled laser diode pumps. High-power fiber-coupled laser diodes (see Coherent Brochure, FAP800 laser diode, 35 Watts or higher) are available only recently. In this invention, high-power fiber-coupled laser diodes are used as the end pump. In addition, in this invention, a high-power pump scheme is also provided which combines multiple low and medium power laser diodes using a fiber combiner.

(2) Treatment of thermal transfer of the laser crystal. In a high-power diode end-pumped solid-state laser, only 20% to 60% of the pump power is converted into laser power. A large portion of the rest pump power is converted into heat and high temperature is resulted in the laser crystal, which could lead to thermal cracking of the laser crystals if the heat is not properly treated. A laser crystal mount with excellent heat transfer and circulating cooling mechanism is extremely important. In this invention, a laser crystal mount is designed, which provides the excellent thermal contact by mounting the crystal from diagonal direction in addition to the use of high thermal conductivity material and water circulating cooling.

(3). Designing of the fundamental laser cavity. The designing of high-power solid-state laser cavity is dramatically different from that of the low or medium power solid-state laser cavity. Due to the high-power pumping and mode matching requirement, the beam size at where the laser crystal is located has to be large (usually about 0.8 mm or larger in diameter). On the other hand, high-efficiency intracavity harmonic generation requires a small laser beam size at where the nonlinear harmonic crystals are located. Therefore, the fundamental cavity designing will not be satisfied by just using a simple cavity commonly used in the low or medium-power diode end-pumped solid-state laser, in which the beam size is more or less uniform through the entire fundamental laser cavity. Furthermore, due to the high-power pump, the laser crystal will act like a lens, which is the so-call thermal lens, or thermal lensing effect (see also U.S. Pat. No. 5,410,559). In a high-power diode end-pumped solid-state laser, such effect can be very strong and the thermal lens can be very short. In this invention the fundamental laser cavity is designed in such a way that the fundamental laser beam size is nonuniform through the laser cavity: the beam size is big at where the laser crystal is located and is small at where the nonlinear harmonic crystals are located, and the following criteria are satisfied at the same time: (1) a large laser beam size in the laser crystal allows a large pump beam size which prevents the thermal cracking and weakens the thermal lens effect at the same time; (2) a small beam size in the harmonic crystals enables a high fundamental power intensity and thus the high-efficiency and high-power harmonic generations. In addition, in this invention the strong thermal lens is carefully compensated by using the predetermined nearby curved pumping mirrors.

(4) Intracavity and extracavity harmonic generations. High intensity is required for efficient harmonic generations. Intracavity is a major way to do so, which had been discussed about 40 years ago (see paper: IEEE J. Quan. Electr. QE-6, 215-223, 1970). However, currently the power level of UV and deep-UV harmonic generations is limited by the following difficulties: (a) high fundamental power is not available, (b) most of the commonly used harmonic crystals have absorption at the UV and deep-UV wavelengths, which leads to low harmonic generation efficiency and possible damage of the harmonic crystals, (c) it is difficult to optimize the fundamental cavity and the harmonic generation cavity at the same time (d) most of the harmonic crystals are hydroscopic and the protection coating at the UV or deep-UV wavelength is easy to be damaged. This invention focuses on solving all these problems, resulting in a high-power diode end-pumped solid-state laser and its UV and deep-UV harmonic generations.

ABBREVIATION OF WORDS USED IN THE INVENTION

F: fundamental laser light
SHG: second harmonic generation
THG: third harmonic generation
FHG: fourth harmonic generation
5HG: fifth harmonic generation

DETAILED DESCRIPTION OF THE DRAWINGS

Figure 1:
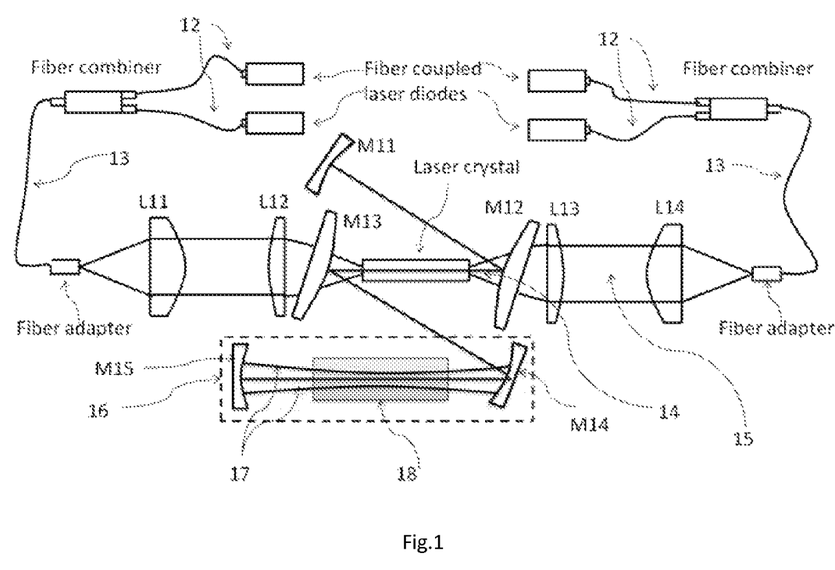
FIG. 1. is a high-power solid-state laser, end-pumped by multiple randomly polarized laser diodes.

FIG. 1. is a high-power solid-state laser using multiple high-power randomly polarized laser diodes as end pumps. Multiple fiber-coupled laser diodes can be combined through a fiber combiner to obtain high pump power. The fibers connecting the laser diodes have a core size of 200 to 800 m (12). The core size of the fiber connecting the output of the combiner is about 0.4 to 2.1 mm (13). Two pairs of lenses with predetermined focal lengths, L11 to L14, are used in a telescope way to match the pump beam size to that of the fundamental laser light. The fundamental laser cavity is formed between M11 to M15. Mirror M12 and M13 serves as the pump mirrors, reflecting the fundamental laser light and transmitting the pump diode light at about 795 nm or 808 nm or 888 nm. Curved mirrors M12 and M13 are used to compensate the thermal lensing effect caused by the high-power pumping. The beam size of the fundamental laser light is large inside the laser crystal. Between M14 and M15, the fundamental laser beam size is designed to be small for generating high-power harmonic laser light (18). The laser crystal is Nd-doped crystals, such as Nd:YAG, Nd:YLF, Nd:YVO$_4$, Nd:GdO$_4$. The fundamental wavelength is 1064 nm or 1053 nm. The optical conversion efficiency is about 20% to 60%. In addition, if the pump diode has enough high power, the fiber combiners on either side or both sides can be removed and the number of diodes can be reduced.

Figure 2:
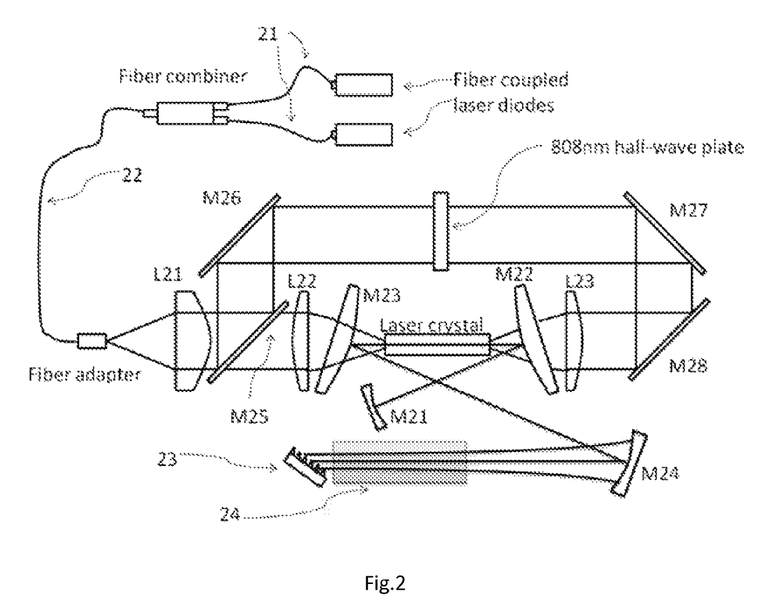
FIG. 2. is a high-power solid-state laser, end-pumped by polarization-controlled laser diodes.

FIG. 2. is a high-power diode end-pumped solid-state laser using polarization controlled pumping scheme. In this embodiment, randomly polarized pumping light from the laser diodes is coupled in the telescope via fiber adapter and lens L21. Mirror M25 is a polarization beam splitter (it can be a Brewster plate, as well), which transmits the horizontally linearly polarized and reflects the vertically polarized light. The transmitted light pumps on one end of the laser crystal. The vertically polarized light is rotated into horizontally polarized light by a half-wave plate and directed on the other side of the laser crystal. One of the end mirrors can be replaced by a grating to obtain narrow line width. For example, a diffractive grating aligning at the Littrow angle can be used as the end mirror in both embodiments shown in FIG. 1 and FIG. 2. In addition, if the pump diode has enough high power, the fiber combiners on either side or both sides can be removed and the number of diodes can be reduced.

Figure 3:
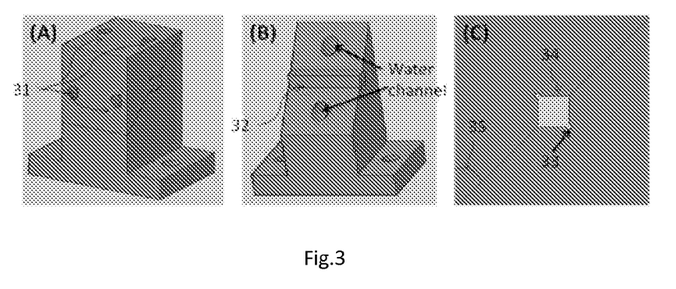
FIG. 3. is the design of crystal mounts in a high-power laser.

FIG. 3 is a crystal mount for a high-power diode end-pumped solid-state laser, in which the crystal is mounted from the diagonal direction. For example, the mounting angle (35) is 45 degree for a 3×3×15 mm$^3$ laser crystal. For a rectangular laser crystal, the mounting angle is $\tan^{-1}(a/.b)$, where a and b are the width and height of laser crystal. Screws are used to hold the two parts together (the screws holes are shown in part A, 31, but not in B for simplicity). Water channel going through the bottom part to the top part are shown in B, providing water circulating cooling. Indium foil is used between the crystal and the mount, 34. Two small grooves (33) are designed to give room for the extra indium foil due to the deformation while tightening the screws (31).

Figure 4:
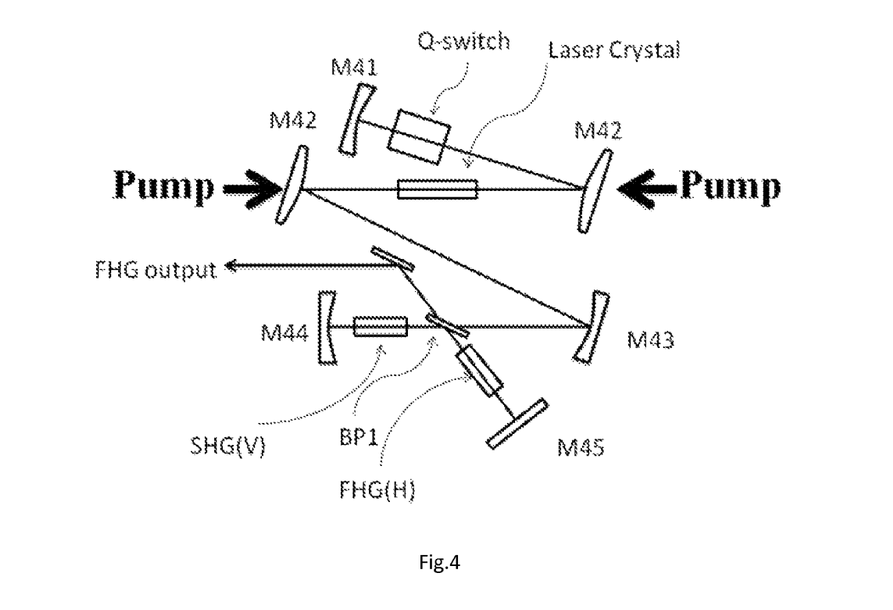
FIG. 4. is a high-power diode end-pumped solid-state UV laser using intracavity fourth harmonic generation.

FIG. 4. is a high-power diode-pumped solid-state UV laser with intracavity fourth harmonic generation. There are two laser cavities in this laser. Two Brewster mirrors (BP1 and BP2) are used at the Brewster incident angle. The fundamental laser cavity is formed by M40, M41, M42, M43 and M44. The pumping scheme can be either FIG. 1. or FIG. 2. An electro-optical or acoustic-optical Q-switch can be used inside the fundamental cavity, for example, before the end mirror M41. The fundamental light is horizontally polarized. A second harmonic crystal is put at focused region in the fundamental laser cavity between M43 and M44. The vertically polarized SHG light is generated by a type-I LBO crystal, which can be critically or noncritically phase matched. The second laser cavity is formed by M44, BP1, BP2 and M45. The SHG laser light has high reflection on mirror BP1 and oscillates in the second cavity. A fourth harmonic crystal (FHG(H)) is inserted between the two Brewster plates, and generates horizontally polarized FHG laser light. The FHG (H) is type-I critically phase matched, which can be BBO, CLBO, KTP or KDP and other harmonic crystals. Mirror 44 has a high reflection for both the fundamental and SHG laser light. Mirror M45 has a high reflection for the SHG and FHG laser light. The Brewster plate BP1 transmits fundamental and FHG laser light, and reflects the SHG laser light.

Figure 5:
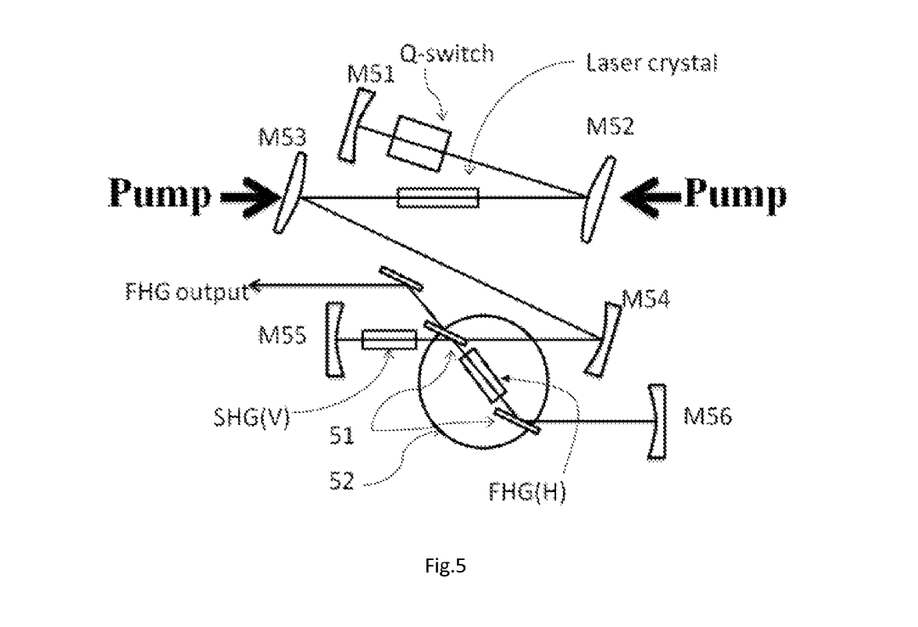
FIG. 5. is a high-power diode end-pumped solid-state UV laser using intracavity fourth harmonic generation and a Brewster roof mirror.
Figure 6:
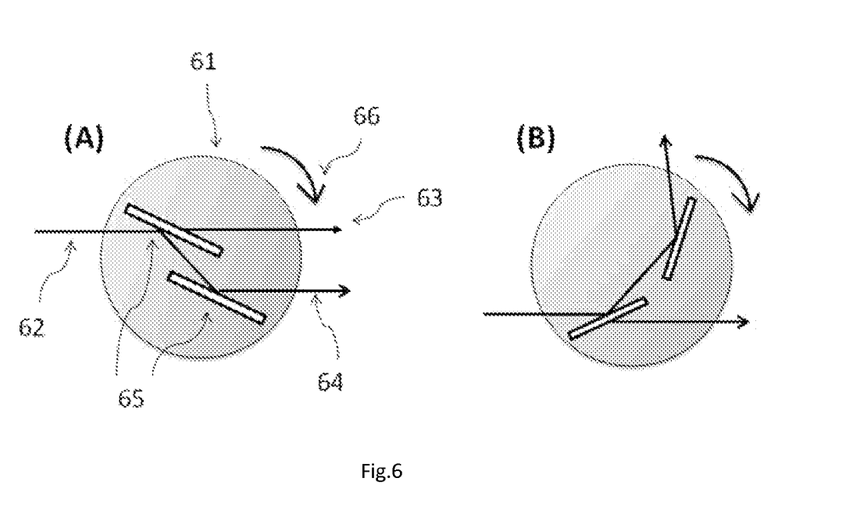
FIG. 6. is the design of a Brewster roof mirror.

FIG. 5. is another embodiment of a high-power diode end-pumped solid-state UV laser using intracavity fourth harmonic generation. Comparing to the embodiment shown in FIG. 4, this embodiment uses a Brewster roof mirror, a pair of Brewster mirrors (51) mounted on a rotation stage (52). The detailed description and advantage of the Brewster roof mirror is shown in FIG. 6. Using the intracavity Brewster roof mirror isolates the fundamental laser cavity and the SHG laser cavity.

FIG. 6. shows a Brewster roof mirror. As shown in FIG. 6 (A), two Brewster mirrors (65) are mounted on a rotation stage (61). The two Brewster mirrors are mounted at Brewster incidence angle and are parallel to each other. The incident lights contain two mixed laser beams, one is horizontally polarized (or P polarization) and the other is vertically polarized (or S polarization). After passing the two Brewster mirrors, the two laser beams (63 and 64) are separated and the separation distance can be changed by slightly rotating the rotation stage, but still parallel to each other. Furthermore, the transmission of the P polarization light can be optimized to 100% without changing its propagation whiling rotating the roof mirror. This can be very useful in the designing of laser cavity with the propagation of multiple laser beams, such as intracavtiy harmonic generations. FIG. 6(B) is another type of Brewster roof mirror. In this designing, after passing the Brewster roof mirror, the two lights will propagate at a fixed angle and the angle between the two lights will not change while rotating the Brewster roof mirror. For example, the Brewster mirrors are made of BK7 glass with the refractive index of n=1.5, the Brewster angle is 56 degree and the two separated laser beams propagate at an angle of 84 degree.

Figure 7:
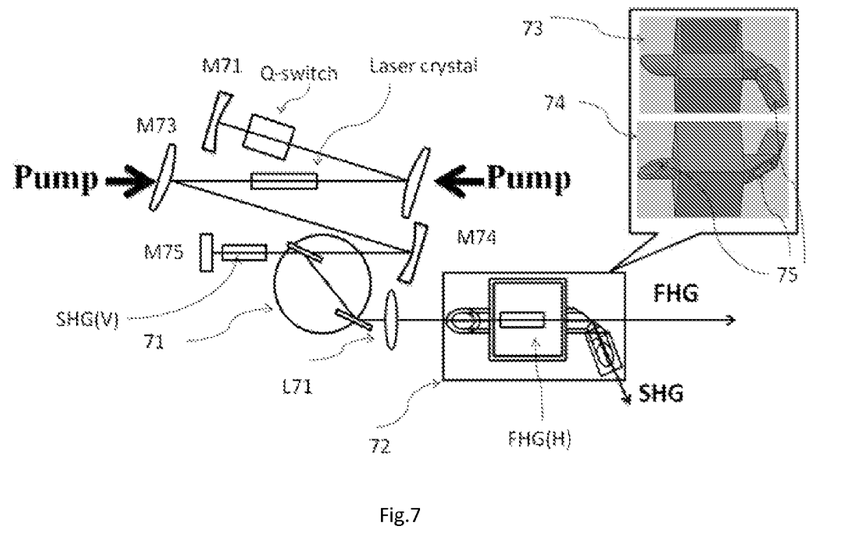
FIG. 7. is a high-power diode end-pumped solid-state UV laser using extracavity fourth harmonic generation and a Brewster roof mirror and a specially designed crystal chamber.

FIG. 7 is a high-power diode end-pumped solid-state UV laser using extracavity fourth harmonic generation. A Brewster roof mirror and a specially designed fourth harmonic generation crystal chamber (73, 74) is used in this embodiment. The fundamental cavity and the second harmonic generation is the same as shown in FIG. 4 and FIG. 5. SHG laser beam is vertically polarized. The FHG crystal chamber is designed to be air-tight. Three Brewster plates (75) are used in the chamber as input and exit windows. The input Brewster Window is vertically positioned for minimizing the loss of the input SHG laser light. The forward output Brewster windows is horizontally positioned for minimizing the loss of the exiting FHG laser light and the other window is vertically positioned as an exit for the unconverted SHG laser light.

Figure 8:
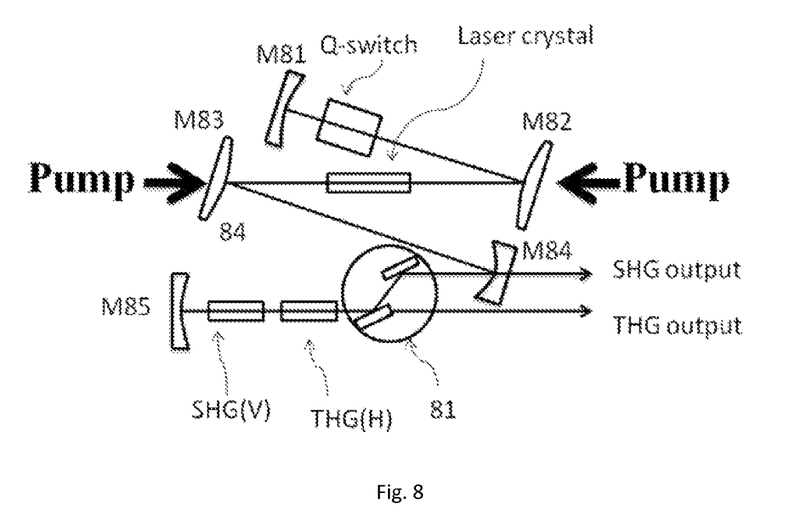
FIG. 8. is a high-power diode end-pumped solid-state UV laser using intracavity third harmonic generation and a Brewster roof mirror.

FIG. 8 is a high-power diode end-pumped solid-state UV laser using intracavity third harmonic generation. All the harmonic crystals are put closely in the focusing region of the fundamental cavity formed by the two curved mirrors (M84 and M85), which have been carefully designed (see FIGS. 1 and 2.). The fundamental laser light is horizontally polarized. A type-I LBO SHG crystal (SHG(V)) is used to generate vertically polarized SHG. A type-II LBO THG crystal (THG (H)) is used to combine the horizontally polarized fundamental laser light and the vertically polarized SHG laser light and generate the horizontally polarized THG laser light. A coated Brewster roof mirror set (91) is used to separate the THG laser light from fundamental and SHG laser light. The two Brewster plates in the Brewster roof mirror set are coated with high reflection coating for the fundament laser light (1064 nm or 1053 nm) at the Brewster incident angle. By rotating the coated Brewster roof mirror, the optimized THG laser light output can be achieved without changing the alignment of the fundamental and SHG cavity alignment.

Figure 9:
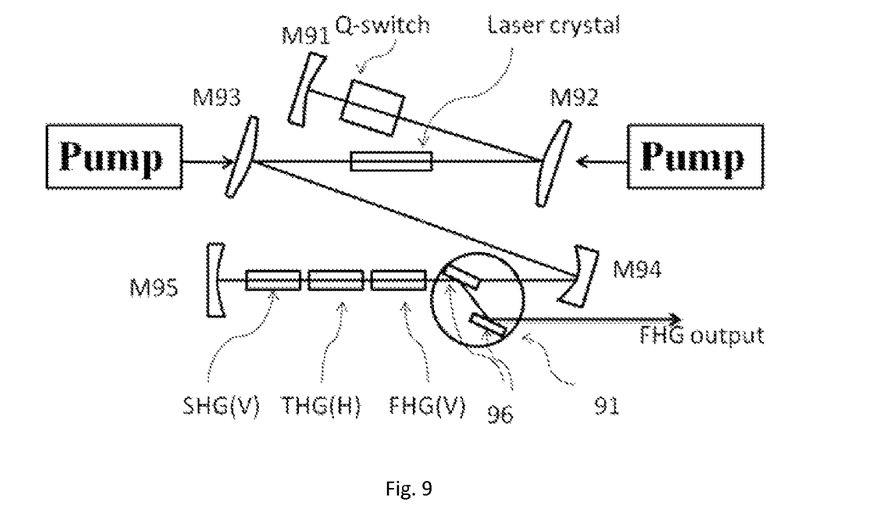
FIG. 9. is another high-power diode end-pumped solid-state UV laser using intracavity fourth harmonic generation and a Brewster roof mirror.

FIG. 9 is another high-power diode end-pumped solid-state UV laser using intracavity fourth harmonic generation. All the harmonic generation crystals are put in the focusing region of the fundamental cavity formed by mirror M94 and M95 according to the fundamental cavity designing in FIG. 1 and FIG. 2. The first type-I LBO crystal (SHG(V)) generates vertically polarized SHG laser light. The second type-II LBO crystal(THG(H)) is used for combining the horizontally polarized fundamental laser light and the vertically polarized SHG laser light and generating the horizontally polarized THG laser light. The third type-I LBO crystal (FHG(V)) combines the horizontally polarized THG laser light and the horizontally polarized fundamental laser light and generates the vertically polarized FHG laser light. The two Brewster mirrors (96) are coated with high-reflection coating for the FHG laser light. By rotating the Brewster roof mirror, 100% transmission for the fundamental laser light is achieved at the Brewster incident angle. The FHG UV laser outputs through the second Brewster mirror in the Brewster roof mirror.

Figure 10:
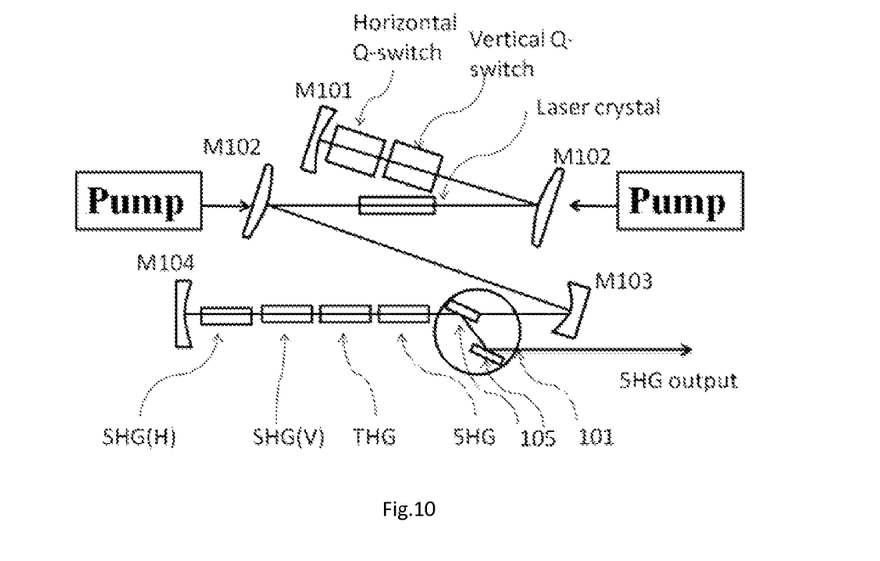
FIG. 10 is a high-power diode end-pumped solid-state deep-UV laser using intracavity fifth harmonic generation and a Brewster roof mirror.

FIG. 10 is a high-power diode end-pumped solid-state deep-UV laser using intracavity fifth harmonic generation. It is particularly designed for a non-polarized laser 1, such as Nd:YAG laser, in which both horizontally and vertically polarized fundamental laser lights (1064nn) are generated in the fundament cavity. Two Q-switched are used for Q-switching operation, one for the horizontally polarized fundamental light (1064(H)) and the other for the vertically polarized fundamental light (1064(V)). Two Type-I LBO crystals are used to generate both horizontally and vertically polarized SHG laser lights. The horizontally polarized fundamental laser and the vertically polarized SHG laser light generate the horizontally polarized THG laser light, through a type-II LBO crystal. The horizontally polarized SHG light and the horizontally polarized THG laser light combines at the fifth harmonic crystal (5HG) and generates the vertically polarized $5^{th}$ harmonic UV laser light, using a type-I BBO crystal, or KTP or KDP crystal. The two Brewster mirrors (105) are coated with high reflection at the 5HG wavelength. The 5HG laser light outputs through the second Brewster mirror of Brewster roof mirror. The transmission of fundamental light at the first Brewster mirror can be maximized by rotating the Brewster roof mirror.

Figure 11:
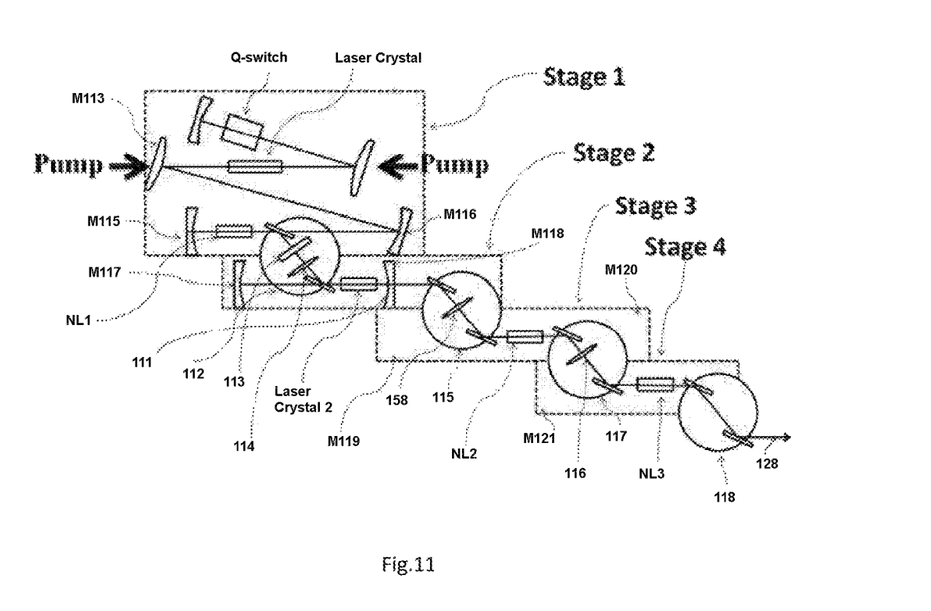
FIG. 11 is a high-power diode end-pumped tunable UV and deep-UV laser using multiple-stage harmonic generation apparatus and multiple Brewster roof mirrors

FIG. 11 is a high-power diode end-pumped solid-state tunable UV laser using multiple-stage harmonic generations. Two laser crystals (Laser crystal 1 and Laser crystal 2) are used in this embodiment. Laser crystal 1 is Nd-doped laser crystal, such as Nd:YVO$_4$, Nd:YLF, Nd:GdO4 or Nd:YAG, and Laser crystal 2 is a Ti:Sapphire laser crystal. Stage 1 is the Nd-doped fundamental laser cavity with intracavity SHG generation and the fundamental cavity is described in FIG. 1 and FIG. 2. In Stage 1 intracavity second harmonic generation is used through the second harmonic crystal (NL1), and the generated vertically polarized SHG laser (532 nm or 527 nm) is directed into Stage 2, the Ti:sapphire laser cavity, through the coated Brewster roof mirror set (112). The second Brewster mirror of 112 has a high reflection coating for 532 nm or 527 nm laser. Inside 112, a half wave plate (113) and a focus lens (114) is used to rotate the SHG light to horizontally polarized and then focus it. Stage 2 is the Ti:Sapphire laser cavity, mirror M117 has a broadband high-reflection coating from 650 nm to 1000 nm (this coating is commonly commercially available, for example, CVI lasers). M118 is broadband output coupler, with a predetermined predetermined transmission rate. The Ti:Sapphire crystal (Laser crystal 2) can be Brewster-cut or broadband antireflection coated. Mirror M117 can be replaced by a broadband refractive grating to narrow the line width. Stage 3 is the second harmonic generation of the Ti:Sapphire laser, using a type-I LBO crystal (NL2) or other second harmonic generation crystals. The output wavelength range is from 412 nm to 500 nm. Different LBO crystals with angle cut are needed for different wavelength ranges. Stage 4 is the fourth harmonic generation of the Ti:Sapphire laser light, using a type-I crystal (NL3), CLBO, BBO or other crystals. And the final output (128) has a wavelength range of from 212 to 250 nm. In this designing, a tunable UV laser from 210 to 250 nm can be obtained.

Figure 12:
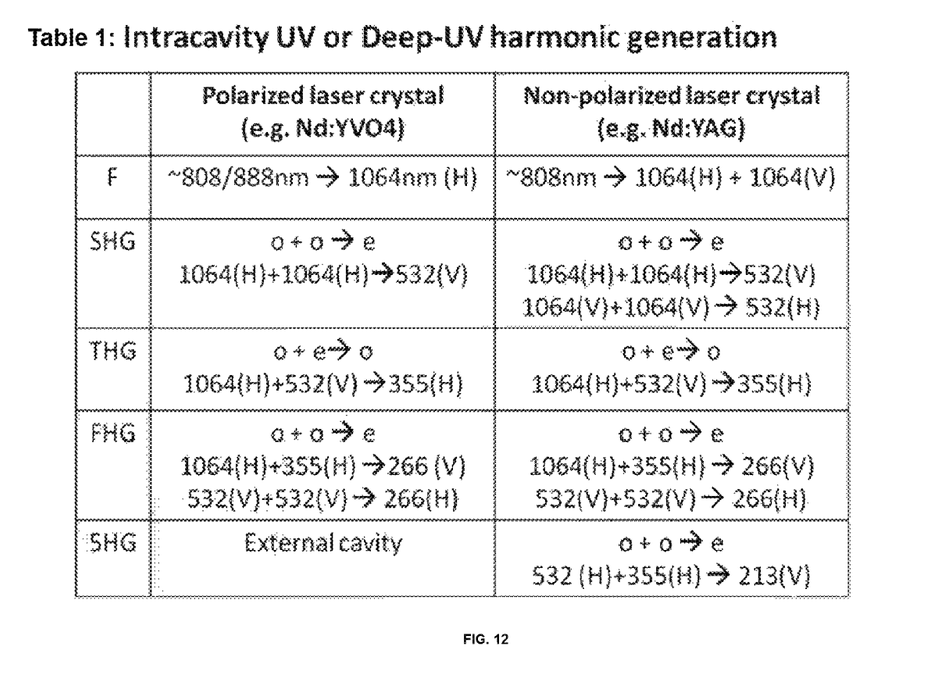
FIG. 12 is the summary of the Nd-doped lasers and their harmonic generations used in this invention

FIG. 12 summarizes all of the laser transitions and the harmonic generations. The phase matching types, the wavelength and polarization states of all laser lights are shown in the table.

I claim:
1. A high-power diode end-pumped solid-state laser and its UV and deep-UV harmonic generations comprising:
   a. One or multiple fiber-coupled laser diodes as end pumps, wherein the pumping light of said laser diode can be split into two beams by a polarization beam splitter, the transmitted light from said beam splitter is horizontally polarized and pumps said laser crystal from one end, the reflected light from said beam splitter is vertically polarized and rotates its polarization by 90° after passing through a half wave plate and pumps said laser crystal from the other end;

b. A laser crystal, said laser crystal can be Nd:YAG, Nd:YVO4, Gd:WO4, or Nd:YLF, which absorbs the light of said pumps and converts it into a fundamental laser light;

c. One or multiple pairs of pump lens, said pump lens pair or pairs are arranged in a telescope way to image the light of said pumps on one end or both ends of said laser crystal;

d. A fundamental laser cavity with two high-reflection end mirrors and multiple high-reflection folding mirrors, said end mirror means the reflected light reversely follows the path of the incident light after it is reflected by said end mirror, said folding mirror means the reflected light doesn't follow the path of the incident light after it is reflected by said folding mirror;

e. A Q-switch in said fundamental laser cavity, said Q-switch is an electro-optic or acoustic-optical Q-switch;

f. An intracavity SHG crystal converting said fundamental laser light into SHG laser light;

g. a SHG laser cavity, said SHG cavity has two end mirrors having high reflection for said SHG laser light, said SHG laser cavity can share one end mirror with said fundamental laser cavity;

h. One or multiple THG, FHG and 5HG harmonic crystals, said crystals convert said SHG laser light and said fundamental laser light into UV or deep UV laser lights; and i. One or multiple mirrors separating said UV or deep-UV laser light from said fundamental laser light and SHG laser light.

2. The laser of claim 1 wherein said multiple fiber-coupled laser diodes can be combined through fiber combiners to achieve higher pumping power, said diodes' wavelength is about 795 nm, 808 nm or 888 nm.

3. The laser of claim 1 wherein said folding mirrors near said laser crystal have predetermined curvatures for compensating the thermal lensing effect of said laser crystal.

4. The laser of claim 1 wherein two mirrors in said fundamental cavity have such predetermined curvatures that the beam size of said fundamental laser light is small between said two mirrors.

5. The laser of claim 1 wherein one of said end mirrors of said fundamental laser cavity can be replaced by a grating.

6. The laser of claim 1 wherein intracavity fourth harmonic generation can be obtained by putting a FHG crystal in said SHG laser cavity, said fundamental laser cavity and said SHG laser cavity are separated by a coated Brewster mirror which transmits said fundamental light and said FHG laser light at Brewster incident angle and reflects SHG laser light.

7. The laser of claim 1 wherein said fundamental cavity can contain one SHG crystal and one THC crystal, said SHG crystal generates SHG laser light, said THG crystal combines said SHG laser light with said fundamental laser and generates THG UV laser light.

8. The laser of claim 1 wherein a Brewster roof mirror can be used, said Brewster roof mirror comprises two Brewster mirrors on a rotation stage, the input lights which are two or multiple mixed lights with different polarizations split after hitting the first Brewster mirror, the Polarization light transmits from the first Brewster mirror, the S polarization light reflects on the two Brewster mirrors which are coated with high reflection coating for the S polarization light.

9. The laser of claim 1 wherein said fundamental laser cavity can have two intracavity harmonic crystals, the first crystal is a SHG crystal, the second crystal is a FHG crystal for generating FHG laser light which can be separated and outputs through a Brewster roof mirror.

10. The laser of claim 1 wherein said fundamental laser cavity can have three intracavity harmonic crystals, the crystal is a SHG crystal, the second crystal is a sum-frequency THG crystal, the third crystal is a sum-frequency FHG crystal, and a Brewster roof mirror is used to separate FHG laser light from fundamental, SHG and THG laser light.

11. The laser of claim 1 wherein said fundamental laser cavity with nonpolarized laser crystal such as Nd:YAG can have four intracavity harmonic crystals, the first two crystals are SHG crystals and generate both horizontally and vertically polarized SHG laser lights, the third crystal is a type-II crystal such as LBO crystal and generates THG laser light, the fourth crystal is a 5HG type-I crystal and combines said THG laser light with its same polarization SHG laser light and generates 5HG laser light, said 5HG laser light can be separated and outputs through a Brewster roof mirror.

12. The laser of claim 1, wherein said SHG laser light's wavelength is 532 nm or 527 nm, said THG laser light's wavelength is 355 nm or 351 nm, said FHG laser light's wavelength is 266 nm or 263 nm, and said 5HG laser light's wavelength is 213 nm or 211 nm.

13. A high-power diode end-pumped solid-state laser and its UV and deep-UV harmonic generations, comprising:

a. one or multiple fiber-coupled laser diodes as end pumps;

b. a laser crystal, said laser crystal can be Nd:YAG, Nd:YVO4, Gd:WO4, or Nd:YLF, which absorbs the light of said pumps and converts it into a fundamental laser light;

c. one or multiple pairs of pump lens, said pump lens pair or pairs are arranged in a telescope way to image the light of said pumps on one end or both ends of said laser crystal;

d. a fundamental laser cavity with two high-reflection end mirrors and multiple high-reflection folding mirrors, said end mirror means the reflected light reversely follows the path of the incident light after it is reflected by said end mirror, said folding mirror means the reflected light doesn't follow the path of the incident light after it is reflected by said folding mirror;

e. a Q-switch in said fundamental laser cavity, said Q-switch is an electro-optic or acoustic-optical Q-switch;

f. an intracavity SHG crystal converting said fundamental laser light into SHG laser light;

g. a SHG laser cavity, said SHG cavity has two end mirrors having high reflection for said SHG laser light, said SHG laser cavity can share one end mirror with said fundamental laser cavity;

h. one or multiple THG, FHG and 5HG harmonic crystals, said crystals convert said SHG laser light and said fundamental laser light into UV or deep UV laser lights;

i. one or multiple mirrors separating said UV or deep-UV laser light from said fundamental laser light and SHG laser light; and j. a Brewster roof mirror comprising two Brewster mirrors on a rotation stage, the input lights which are two or multiple mixed lights with different polarizations split after hitting the first Brewster mirror, the Polarization light transmits from the first Brewster mirror, the S polarization light reflects on the two Brewster mirrors which are coated with high reflection coating for the S polarization light.

14. The laser of claim 13, wherein said multiple fiber-coupled laser diodes can be combined through fiber combiners to achieve higher pumping power, said diodes' wavelength is about 795 nm, 808 nm or 888 nm.

15. The laser of claim 13, wherein the pumping light of said laser diode can be split into two beams by a polarization beam splitter, the transmitted light from said beam splitter is horizontally polarized and pumps said laser crystal from one end, the reflected light from said beam splitter is vertically polarized and rotates its polarization by 90° after passing through a half wave plate and pumps said laser crystal from the other end.

16. The laser of claim 13, wherein said folding mirrors near said laser crystal have predetermined curvatures for compensating the thermal lensing effect of said laser crystal.

17. The laser of claim 13, wherein two mirrors in said fundamental cavity have such predetermined curvatures that the beam size of said fundamental laser light is small between said two mirrors.

18. The laser of claim 13, wherein one of said end mirrors of said fundamental cavity can be replaced by a grating.

19. The laser of claim 13 wherein intracavity fourth harmonic generation can be obtained by putting a FHG crystal in said SHG laser cavity, said fundamental laser cavity and said SHG laser cavity are separated by a coated Brewster mirror which transmits said fundamental light and said FHG laser light at Brewster incident angle and reflects SHG laser light.

20. The laser of claim 13, wherein said fundamental cavity can contain one SHG crystal and one THC crystal, said SHG crystal generates SHG laser light, said THG crystal combines said SHG laser light with said fundamental laser and generates THG UV laser light.

21. The laser of claim 13, wherein said fundamental laser cavity can have two intracavity harmonic crystals, the first crystal is a SHG crystal, the second crystal is a FHG crystal for generating FHG laser light which can be separated and outputs through a Brewster roof mirror.

22. The laser of claim 13, wherein said fundamental laser cavity can have three intracavity harmonic crystals, the crystal is a SHG crystal, the second crystal is a sum-frequency THG crystal, the third crystal is a sum-frequency FHG crystal, and a Brewster roof mirror is used to separate FHG laser light from fundamental, SHG and THG laser light.

23. The laser of claim 13, wherein said fundamental laser cavity with nonpolarized laser crystal such as Nd:YAG can have four intracavity harmonic crystals, the first two crystals are SHG crystals and generate both horizontally and vertically polarized SHG laser lights, the third crystal is a type-II crystal such as LBO crystal and generates THG laser light, the fourth crystal is a 5HG type-I crystal and combines said THG laser light with its same polarization SHG laser light and generates 5HG laser light, said 5HG laser light can be separated and outputs through a Brewster roof mirror.

24. The laser of claim 13, wherein said SHG laser light's wavelength is 532 nm or 527 nm, said THG laser light's wavelength is 355 nm or 351 nm, said FHG laser light's wavelength is 266 nm or 263 nm, and said 5HG laser light's wavelength is 213 nm or 211 nm.

25. A high-power diode end-pumped solid-state laser and its UV and deep-UV harmonic generations, comprising:
  a. one or multiple fiber-coupled laser diodes as end pumps;
  b. a laser crystal, said laser crystal can be Nd:YAG, Nd:YVO4, Gd:WO4, or Nd:YLF, which absorbs the light of said pumps and converts it into a fundamental laser light;
  c. one or multiple pairs of pump lens, said pump lens pair or pairs are arranged in a telescope way to image the light of said pumps on one end or both ends of said laser crystal;
  d. a fundamental laser cavity with two high-reflection end mirrors and multiple high-reflection folding mirrors, said end mirror means the reflected light reversely follows the path of the incident light after it is reflected by said end mirror, said folding mirror means the reflected light doesn't follow the path of the incident light after it is reflected by said folding mirror, wherein said fundamental laser cavity with nonpolarized laser crystal such as Nd:YAG can have four intracavity harmonic crystals, the first two crystals are SHG crystals and generate both horizontally and vertically polarized SHG laser lights, the third crystal is a type-II crystal such as LBO crystal and generates THG laser light, the fourth crystal is a 5HG type-I crystal and combines said THG laser light with its same polarization SHG laser light and generates 5HG laser light, said 5HG laser light can be separated and outputs through a Brewster roof mirror;
  e. a Q-switch in said fundamental laser cavity, said Q-switch is an electro-optic or acoustic-optical Q-switch;
  f. an intracavity SHG crystal converting said fundamental laser light into SHG laser light;
  g. a SHG laser cavity, said SHG cavity has two end mirrors having high reflection for said SHG laser light, said SHG laser cavity can share one end mirror with said fundamental laser cavity;
  h. one or multiple THG, FHG and 5HG harmonic crystals, said crystals convert said SHG laser light and said fundamental laser light into UV or deep UV laser lights; and
  i. one or multiple mirrors separating said UV or deep-UV laser light from said fundamental laser light and SHG laser light.

26. The laser of claim 25, wherein said multiple fiber-coupled laser diodes can be combined through fiber combiners to achieve higher pumping power, said diodes' wavelength is about 795 nm, 808 nm or 888 nm.

27. The laser of claim 25, wherein the pumping light of said laser diode can be split into two beams by a polarization beam splitter, the transmitted light from said beam splitter is horizontally polarized and pumps said laser crystal from one end, the reflected light from said beam splitter is vertically polarized and rotates its polarization by 90° after passing through a half wave plate and pumps said laser crystal from the other end.

28. The laser of claim 25, wherein said folding mirrors near said laser crystal have predetermined curvatures for compensating the thermal lensing effect of said laser crystal.

29. The laser of claim 25, wherein two mirrors in said fundamental cavity have such predetermined curvatures that the beam size of said fundamental laser light is small between said two mirrors.

30. The laser of claim 25, wherein one of said end mirrors of said fundamental cavity can be replaced by a grating.

31. The laser of claim 25 wherein intracavity fourth harmonic generation can be obtained by putting a FHG crystal in said SHG laser cavity, said fundamental laser cavity and said SHG laser cavity are separated by a coated Brewster mirror which transmits said fundamental light and said FHG laser light at Brewster incident angle and reflects SHG laser light.

32. The laser of claim 25, wherein said fundamental cavity can contain one SHG crystal and one THC crystal, said SHG crystal generates SHG laser light, said THG crystal combines said SHG laser light with said fundamental laser and generates THG UV laser light.

33. The laser of claim 25, wherein said fundamental laser cavity can have two intracavity harmonic crystals, the first crystal is a SHG crystal, the second crystal is a FHG crystal for generating FHG laser light which can be separated and outputs through a Brewster roof mirror.

34. The laser of claim 25, wherein said fundamental laser cavity can have three intracavity harmonic crystals, the crystal is a SHG crystal, the second crystal is a sum-frequency THG crystal, the third crystal is a sum-frequency FHG crystal, and a Brewster roof mirror is used to separate FHG laser light from fundamental, SHG and THG laser light.

35. The laser of claim 25, wherein said SHG laser light's wavelength is 532 nm or 527 nm, said THG laser light's wavelength is 355 nm or 351 nm, said FHG laser light's wavelength is 266 nm or 263 nm, and said 5HG laser light's wavelength is 213 nm or 211 nm.

* * * * *